(12) United States Patent
Park et al.

(10) Patent No.: US 11,243,806 B2
(45) Date of Patent: Feb. 8, 2022

(54) SYSTEM ON CHIP INCLUDING A MULTI-CORE PROCESSOR AND TASK SCHEDULING METHOD THEREOF

(71) Applicant: SAMSUNG ELECTRONICS CO., LTD., Suwon-si (KR)

(72) Inventors: Jong-Lae Park, Anyang-si (KR); Soohyun Kim, Yongin-si (KR); Youngtae Lee, Seoul (KR); Byung-Soo Kwon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 16/518,159

(22) Filed: Jul. 22, 2019

(65) Prior Publication Data

US 2020/0151005 A1 May 14, 2020

(30) Foreign Application Priority Data

Nov. 9, 2018 (KR) .................. 10-2018-0137229

(51) Int. Cl.
  *G06F 9/46* (2006.01)
  *G06F 9/48* (2006.01)
  *G06F 9/50* (2006.01)
(52) U.S. Cl.
  CPC .......... *G06F 9/4881* (2013.01); *G06F 9/5038* (2013.01)
(58) Field of Classification Search
  CPC ................. G06F 9/4881; G06F 9/5038; G06F 2209/5021; G06F 9/5083; G06F 15/7807; Y02D 10/00
  See application file for complete search history.

(56) References Cited

U.S. PATENT DOCUMENTS

| | | |
|---|---|---|
| 7,441,240 B2 | 10/2008 | Amano et al. |
| 8,230,446 B2 | 7/2012 | McKenney et al. |
| 8,516,488 B1 | 8/2013 | Brown et al. |
| 8,694,705 B2 | 4/2014 | Hara et al. |
| 9,207,943 B2 | 12/2015 | Plondke et al. |
| 9,355,049 B2 | 5/2016 | Yamashita et al. |
| 9,411,641 B2 | 8/2016 | Dickson |
| 9,417,912 B2 | 8/2016 | Suh et al. |
| 9,632,808 B2 | 4/2017 | Zheng et al. |

(Continued)

FOREIGN PATENT DOCUMENTS

| | | |
|---|---|---|
| JP | 2016-001417 | 1/2016 |
| KR | 10-1658035 | 9/2016 |

*Primary Examiner* — Adam Lee

(74) *Attorney, Agent, or Firm* — F. Chau & Associates, LLC

(57) ABSTRACT

A scheduling method of a system on chip including a multi-core processor includes receiving a schedule-requested task, converting a priority assigned to the schedule-requested task into a linear priority weight, selecting a plurality of candidate cores, to which the schedule-requested task will be assigned, from among cores of the multi-core processor, calculating a preemption compare index indicating a current load state of each of the plurality of candidate cores, comparing the linear priority weight with the preemption compare index of the each of the plurality of candidate cores to generate a comparison result, and assigning the schedule-requested task to one candidate core of the plurality of candidate cores depending on the comparison result.

17 Claims, 11 Drawing Sheets

(56) References Cited

U.S. PATENT DOCUMENTS

| | | | |
|---|---|---|---|
| 9,720,836 B2 | 8/2017 | McKenney | |
| 9,727,467 B2 | 8/2017 | McKenney | |
| 2002/0042908 A1* | 4/2002 | Ito | G06F 8/456 |
| | | | 717/149 |
| 2004/0187120 A1* | 9/2004 | Moore | G06F 9/4881 |
| | | | 718/100 |
| 2009/0187915 A1* | 7/2009 | Chew | G06F 9/5033 |
| | | | 718/104 |
| 2011/0191776 A1* | 8/2011 | Bose | G06F 9/46 |
| | | | 718/102 |
| 2012/0131593 A1* | 5/2012 | DePetro | G06F 9/5088 |
| | | | 718/105 |
| 2012/0150830 A1* | 6/2012 | Miyoshi | G06F 16/2453 |
| | | | 707/705 |
| 2012/0174117 A1* | 7/2012 | Jula | G06F 9/5088 |
| | | | 718/105 |
| 2013/0024868 A1* | 1/2013 | Jeong | G06F 9/505 |
| | | | 718/104 |
| 2013/0024870 A1* | 1/2013 | Yamashita | G06F 9/4881 |
| | | | 718/104 |
| 2014/0007131 A1* | 1/2014 | Yamauchi | G06F 9/505 |
| | | | 718/104 |
| 2014/0059325 A1* | 2/2014 | Morimoto | G06F 15/80 |
| | | | 712/42 |
| 2014/0082387 A1* | 3/2014 | Wei | G06F 1/324 |
| | | | 713/322 |
| 2014/0196050 A1* | 7/2014 | Yu | G06F 9/5088 |
| | | | 718/104 |
| 2014/0208331 A1* | 7/2014 | Li | G06F 9/5044 |
| | | | 718/105 |
| 2015/0007187 A1* | 1/2015 | Shows | G06F 9/5088 |
| | | | 718/104 |
| 2015/0026694 A1 | 1/2015 | Akiyama | |
| 2015/0067688 A1* | 3/2015 | Nagasawa | G06F 9/4881 |
| | | | 718/102 |
| 2015/0121388 A1* | 4/2015 | Chang | G06F 9/52 |
| | | | 718/103 |
| 2015/0324234 A1* | 11/2015 | Chang | G06F 9/5033 |
| | | | 718/104 |
| 2016/0239346 A1 | 8/2016 | Kipp | |
| 2016/0291882 A1* | 10/2016 | Wakhare | G06F 9/45545 |
| 2016/0378168 A1* | 12/2016 | Branover | G06F 1/3243 |
| | | | 713/323 |
| 2017/0083383 A1* | 3/2017 | Rider | G06F 9/5094 |
| 2018/0157515 A1* | 6/2018 | Malloy | H04L 47/627 |
| 2018/0260314 A1* | 9/2018 | Singi | G06F 16/9024 |

* cited by examiner

SYSTEM ON CHIP INCLUDING A MULTI-CORE PROCESSOR AND TASK SCHEDULING METHOD THEREOF

CROSS-REFERENCE TO RELATED APPLICATION

This application claims priority under 35 U.S.C. § 119 to Korean Patent Application No. 10-2018-0137229, filed on Nov. 9, 2018 in the Korean Intellectual Property Office, the disclosure of which is incorporated by reference herein in its entirety.

TECHNICAL FIELD

Exemplary embodiments of the inventive concept described herein relate to a semiconductor device, and more particularly, to a system on chip including a multi-core processor and a task scheduling method thereof.

DISCUSSION OF RELATED ART

Multimedia operations and data throughput are increasing in mobile devices. As a result, the adoption of high-speed processors and high-capacity storage mediums is expanding in mobile devices. Mobile devices operate various application programs. For the purpose of operating various application programs, semiconductor devices such as a working memory (e.g., dynamic random-access memory (DRAM)), a non-volatile memory, and an application processor (AP) are used in the mobile devices.

In mobile devices, multi-core processors are used to provide the high performance of an AP. For the purpose of increasing the efficiency of the multi-core processor, tasks may be scheduled with reference to the priority of the task to be processed or the utilization of the currently driving core. However, tasks requiring real-time response are gradually increasing depending on the needs of users. For the purpose of satisfying rich UI/UX requirements of users, tasks of a high priority may inevitably increase, and the quality of service provided by tasks of a lower priority may be degraded. Accordingly, it may be difficult to efficiently assign processor resources and to guarantee service quality only with the current priority-based task scheduling method.

SUMMARY

According to an exemplary embodiment of the inventive concept, a scheduling method of a system on chip including a multi-core processor includes receiving a schedule-requested task, converting a priority assigned to the schedule-requested task into a linear priority weight, selecting a plurality of candidate cores, to which the schedule-requested task will be assigned, from among cores of the multi-core processor, calculating a preemption compare index indicating a current load state of each of the plurality of candidate cores, comparing the linear priority weight with the preemption compare index of the each of the plurality of candidate cores to generate a comparison result, and assigning the schedule-requested task to one candidate core of the plurality of candidate cores depending on the comparison result.

According to an exemplary embodiment of the inventive concept, a system on chip includes a multi-core processor including a plurality of cores and a working memory onto which an operating system driven by the multi-core processor is loaded. The operating system is configured to convert a priority assigned to a task, scheduling of which is requested, into a linear priority weight for collectively managing a real time class task and a fair class task, to select a plurality of candidate cores, to which the task will be assigned, depending on a first condition, to calculate preemption compare indexes indicating a current load state of each of the plurality of candidate cores, and to assign the task to one candidate core of the plurality of candidate cores by comparing the calculated preemption compare indexes with the linear priority weight.

According to an exemplary embodiment of the inventive concept, a scheduling method of a system on chip including a plurality of CPU cores includes converting a priority of a task, scheduling of which is requested, into a linear priority weight assigned regardless of a real time class and a fair class, selecting a plurality of candidate cores among the plurality of CPU cores depending on an operation condition, calculating preemption compare indexes indicating a current load state of each of the plurality of candidate cores, and selecting one of the plurality of candidate cores as a target core for assigning the task, by comparing the preemption compare indexes of the each of the plurality of candidate cores with the linear priority weight.

BRIEF DESCRIPTION OF THE FIGURES

The above and other objects and features of the inventive concept will become apparent by describing in detail exemplary embodiments thereof with reference to the accompanying drawings.

DETAILED DESCRIPTION OF THE EMBODIMENTS

Figure 1:
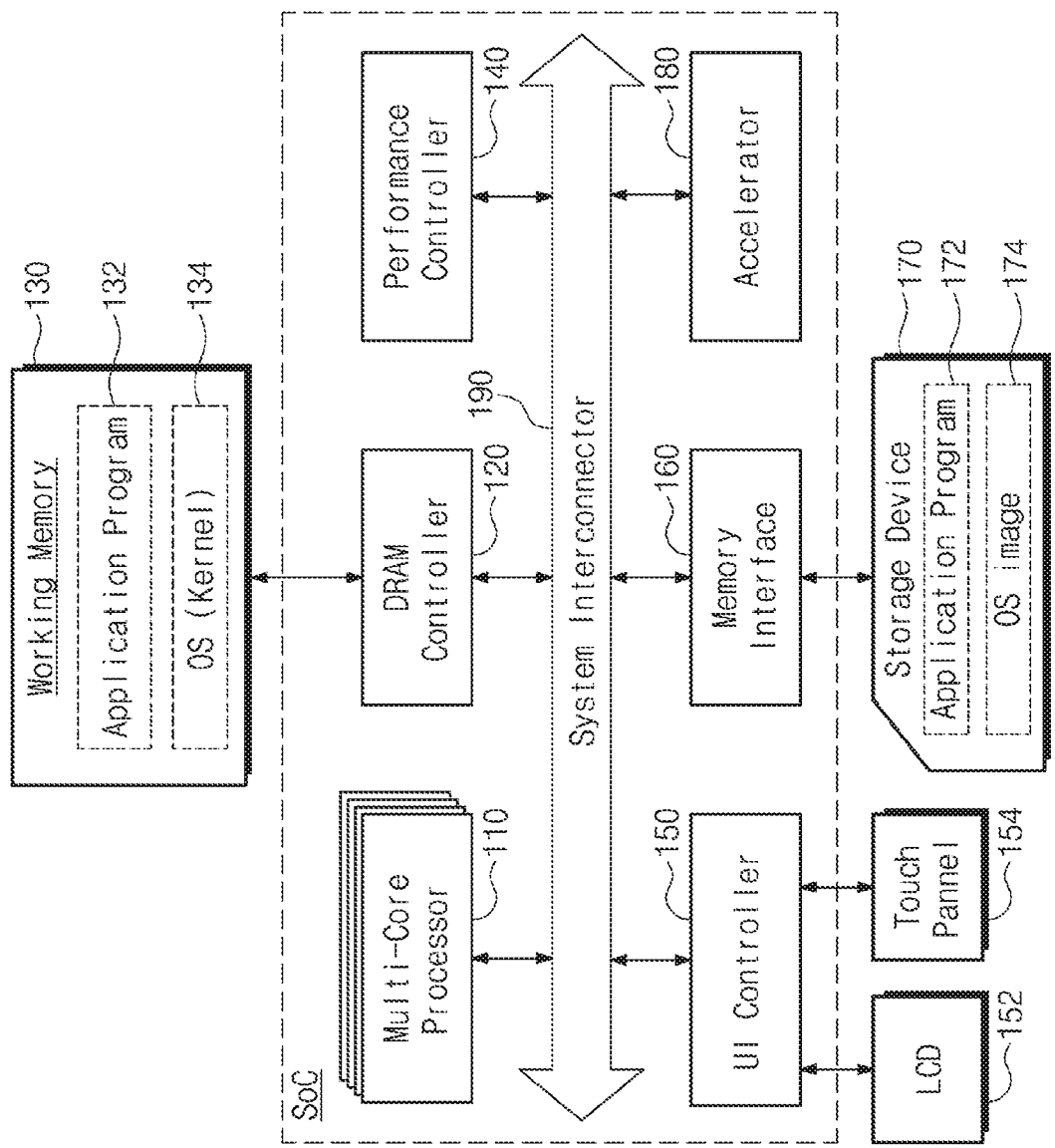
FIG. 1 is a block diagram illustrating a mobile device according to an exemplary embodiment of the inventive concept.

Exemplary embodiments of the inventive concept provide a method for eliminating inefficiencies occurring in priority-based task scheduling in a system on chip or an application processor using a multi-core processor.

Below, exemplary embodiments of the inventive concept will be described in detail with reference to the accompanying drawings Like reference numerals may refer to like elements throughout this application.

FIG. 1 is a block diagram illustrating a mobile device according to an exemplary embodiment of the inventive concept. Referring to FIG. 1, a mobile device 100 may include a system on chip (SoC) and a working memory 130, a liquid crystal display device 152, a touch panel 154, a storage device 170, or the like. The SoC may include a multi-core processor 110, a DRAM controller 120, a performance controller 140, a user interface controller 150, a memory interface 160, and an accelerator 180. However, it should be appreciated that components of the mobile device 100 are not limited to the illustrated components. For example, the mobile device 100 or the SoC may further include a hardware codec for processing image data, a secure block, or the like.

The multi-core processor 110 may execute software (e.g., an application program, an operating system (OS), or device drivers) to be executed in the mobile device 100. The multi-core processor 110 may execute the OS loaded to the working memory 130. The multi-core processor 110 may execute various application programs to be driven on the OS. The multi-core processor 110 may be a homogeneous multi-core processor or a heterogeneous multi-core processor.

Each of the multi-cores of the multi-core processor 110 according to an exemplary embodiment of the inventive concept may be composed of a plurality of power domains operated by independent driving clocks and independent driving voltages. Moreover, it is possible to control driving voltage and driving clock supplied to each of the multi-cores in units of cores. In each of the multi-cores, the frequency of the driving clock and the level of the driving voltage may be changed depending on the processing load of each of the cores. In other words, each core may be controlled in the manner of Dynamic Voltage Frequency Scaling (hereinafter referred to as "DVFS"), which increases the frequency of the driving clock and the level of the driving voltage depending on the size of the load.

In particular, when one task is scheduled in the multi-core processor 110 according to an exemplary embodiment of the inventive concept, tasks having different priority classes may be compared. In addition, a task of a relatively low priority may preempt CPU cores of the multi-core processor 110 under special situations. For example, a task with the priority level of a fair class may preempt the CPU core prior to a task with the priority level of a real time class. This scheduling may be performed in the kernel of the OS.

The DRAM controller 120 provides interfacing between the working memory 130 and the SoC. The DRAM controller 120 may access the working memory 130 at the request of the multi-core processor 110 or any other intellectual property (IP). For example, the DRAM controller 120 may write data in the working memory 130 according to the write request of the multi-core processor 110. Alternatively, the DRAM controller 120 may read out data from the working memory 130 according to a read request of the multi-core processor 110 and may transmit the data to the multi-core processor 110 or the memory interface 160 through a data bus.

Application programs 132 or an OS kernel 134 may be loaded on the working memory 130 during a booting operation. For example, when the mobile device 100 is booted, an OS image 174 stored in the storage device 170 is loaded onto the working memory 130 based on the boot sequence. Overall input/output operations of the mobile device 100 may be supported by the OS. Likewise, the application programs 132 which are selected by a user or provide a basic service may be loaded onto the working memory 130. In addition, the working memory 130 may be used as a buffer memory that stores image data provided from an image sensor such as a camera. The working memory 130 may be a volatile memory such as a Static Random Access Memory (SRAM) or a Dynamic Random Access Memory (DRAM), or a nonvolatile memory such as a phase-change RAM (PRAM), a magneto-resistive (MRAM), a resistive RAM (ReRAM), a ferroelectric RAM (FRAM), a NOR flash memory, or the like.

The tasks processing-requested by the application programs 132 or the OS kernel 134 are processed depending on the scheduling method according to an exemplary embodiment of the inventive concept. For example, in accordance with the scheduling method according to an exemplary embodiment of the inventive concept, a real time class (RT Class) task and a fair class task may be absolutely evaluated under the same condition. Moreover, a plurality of candidate CPU cores, to which the schedule-requested task will be assigned, may be selected depending on the load state of a CPU, a cache reusable ratio, and the settings of a user. Accordingly, task scheduling that is not dependent on only the priority but also considers power consumption and performance of a CPU core is possible. In addition, in accordance with the scheduling method according to an exemplary embodiment of the inventive concept, the load balance for a task, which has a small load even though the priority is high, and a task, which has a large load even though the priority is low, may be easily achieved. This will be described in detail with reference to the following accompanying drawings.

The performance controller 140 may adjust the operation parameters of the SoC depending on the control request provided from the kernel of the OS. For example, the performance controller 140 may adjust the level of DVFS to improve the performance of the SoC. Alternatively, the performance controller 140 may control a driving mode such as Big and Little big.LITTLE of the multi-core processor 110 at the request of the kernel.

The user interface controller 150 controls user inputs and outputs from and to user interface devices. For example, the user interface controller 150 may display a keyboard screen for entering data into the liquid crystal display device 152 under control of the multi-core processor 110. Alternatively, the user interface controller 150 may control the liquid crystal display device 152 such that the user-requested data is displayed. The user interface controller 150 may decode data, which are provided from user input devices such as the touch panel 154, as user input data. Tasks requiring real-time response are gradually increasing depending on the needs of users. For the purpose of satisfying rich UI/UX requirements of users, tasks of a high priority may inevitably increase, and the quality of service provided by tasks of a lower priority may be degraded.

In recent years, for the purpose of satisfying rich UI/UX requirements of users, the attribute of the task associated with the touch panel 154 is assigned to a real time class (RT Class) and the task associated with the touch panel 154 is scheduled. However, competition for preemption of limited CPU resources is cutthroat due to the rapid increase in the number of real time class (RT Class) tasks. In this situation, when a task is scheduled based on only the priority, tasks of real time class with a high priority preempts a CPU core. Since tasks, which have a high priority even though utilization is low, are assigned to any CPU core, it may be difficult to achieve load balancing. In some cases, a task of a real time class may not be scheduled and thus starvation may occur.

The memory interface 160 may access the storage device 170 at the request of the multi-core processor 110. In other words, the memory interface 160 provides an interface between the SoC and the storage device 170. For example, data processed by the multi-core processor 110 is stored in the storage device 170 through the memory interface 160. As another example, the data stored in the storage device 170 may be provided to the multi-core processor 110 through the memory interface 160.

The storage device 170 may be provided as a storage medium of the mobile device 100. The storage device 170 may store user data, application programs 172, the OS image 174, or the like. The storage device 170 may be implemented with a memory card (e.g., a multimedia card (MMC), an embedded MMC (eMMC), a secure digital (SD) card, or a micro SD card). The storage device 170 may include a NAND-type flash memory having a high storage capacity. Alternatively, the storage device 170 may include a next-generation nonvolatile memory, such as a PRAM, an MRAM, a ReRAM, or a FRAM, or a NOR flash memory. As another example, the storage device 170 may be an embedded memory that is included in the SoC.

The accelerator 180 may be provided as a separate IP for improving the processing speed for multimedia or multimedia data. For example, the accelerator 180 may be provided as an IP for improving the performance in which texts, audio, still images, animation, videos, two-dimensional data, or three-dimensional data is processed.

A system interconnector 190 is a system bus for providing an on-chip network inside the SoC. The system interconnector 190 may include, for example, a data bus, an address bus, and a control bus. The data bus is a path through which data is transmitted. The data bus may be provided as a path for accessing the working memory 130 or the storage device 170. The address bus provides an address exchange path between IPs. The control bus provides a path through which control signals are transferred between the IPs. However, a configuration of the system interconnector 190 is not limited to the above description, and the system interconnector 190 may further include arbitration devices for efficient management.

According to the above description, the mobile device 100 may perform more flexible scheduling depending on the priority of the schedule-requested task and the load state of the current CPU cores, a cache reusable ratio, and the settings of a user. In other words, in accordance with the scheduling method according to an exemplary embodiment of the inventive concept, performance degradation and load imbalance, starvation in which a core does not receive scheduling, and increase in power consumption may be prevented.

Figure 2:
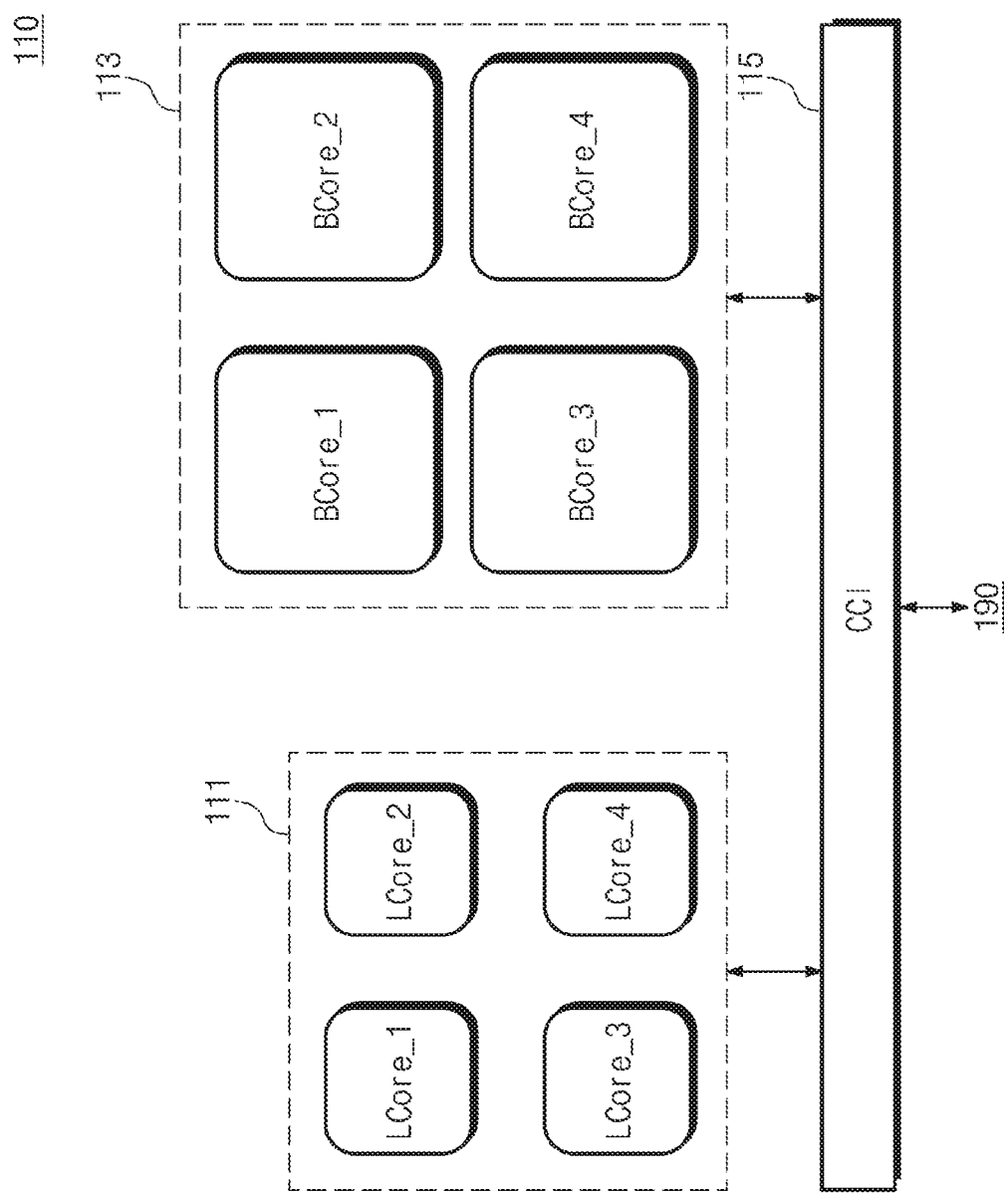
FIG. 2 is a diagram illustrating a structure of a multi-core processor of FIG. 1 according to an exemplary embodiment of the inventive concept.

FIG. 2 is a diagram schematically illustrating a structure of a multi-core processor of FIG. 1 according to an exemplary embodiment of the inventive concept. Referring to FIG. 2 the multi-core processor 110 including heterogeneous cores is schematically illustrated. In an exemplary embodiment of the inventive concept, the multi-core processor 110 may include a first cluster 111, a second cluster 113, and a cache coherent interconnector 115.

The first cluster 111 provides a relatively low processing speed, and includes cores LCore_1, LCore_2, LCore_3, and LCore_4 with low power consumption. Each of the cores LCore_1, LCore_2, LCore_3, and LCore_4 may perform independent calculation and may control power independently. Herein, the cores LCore_1, LCore_2, LCore_3, and LCore_4 included in the first cluster 111 may be included in the same power domain. In other words, the cores LCore_1, LCore_2, LCore_3, and LCore_4 may receive the same driving voltage or driving frequency. Alternatively, the cores LCore_1, LCore_2, LCore_3, and LCore_4 may receive driving voltages of different levels. In other words, while one core is powered and operated, the other core may be managed in a standby state, an idle state, or a plug-out state.

The second cluster 113 includes cores BCore_1, BCore_2, BCore_3, and BCore_4, each of which has a relatively high processing speed but has low power efficiency. Each of the cores BCore_1, BCore_2, BCore_3, and BCore_4 may perform independent operation processing. Moreover, the cores BCore_1, BCore_2, BCore_3, and BCore_4 may be implemented with high-performance processors, as compared to the cores LCore_1, LCore_2, LCore_3, and LCore_4.

Herein, at least one core of the first cluster 111 and at least one or more cores of the second cluster 113 may be used together. In other words, for high performance and power efficiency, instead of selecting only one cluster of the first cluster 111 and the second cluster 113 (e.g., cluster switching), at least one of the cores of the first cluster 111 and at least one of the cores of the second cluster 113 may be driven simultaneously. This method is called a heterogeneous multi-processing (hereinafter referred to as "HMP") method.

The cache coherent interconnector CCI 115 supports task migration between clusters 111 and 113. In other words, when the first cluster 111 is deactivated and the second cluster 113 is activated, the cache data of the first cluster 111 may be moved to the cache of the second cluster 113. In addition, the migration of a thread sharing a context may be performed by the same procedure. The cache coherent interconnector 115 will be provided as a structure for providing data consistency between the first and second clusters 111 and 113.

Figure 3:
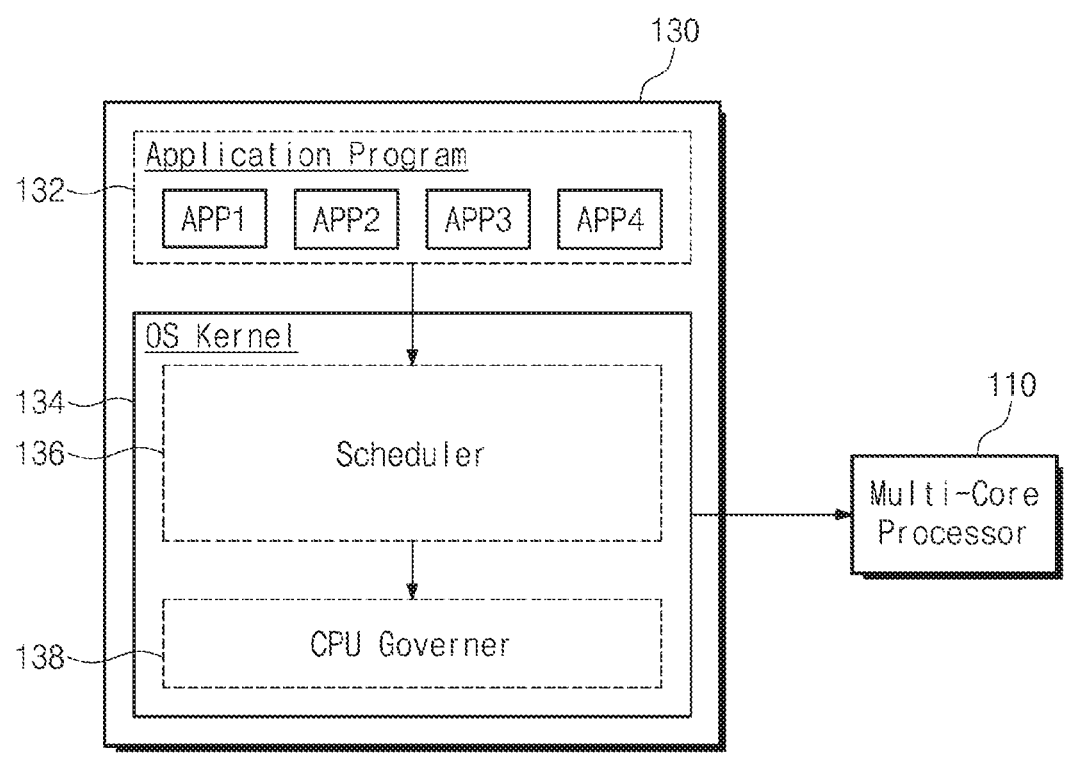
FIG. 3 is a block diagram illustrating a software structure of the mobile device of FIG. 1 according to an exemplary embodiment of the inventive concept.

FIG. 3 is a block diagram illustrating a software structure of the mobile device of FIG. 1 according to an exemplary embodiment of the inventive concept. Referring to FIG. 3, the software hierarchical structure of the mobile device 100, which is loaded in the working memory 130 and driven by the multi-core processor 110, may be divided into the application program 132 and the OS kernel 134. In addition, the OS kernel 134 may further include a device driver that manages various devices such as a memory, a modem, an image processing device, or the like.

The application program 132 may be the software of an upper layer driven as a basic service or driven at the request of a user. The application program 132 may include a plurality of application programs APP1, APP2, APP3, and APP4. The application program 132 may generate a process or a thread for a specific task. The task is a processing unit capable of being assigned to a CPU core. When the playback of a video file is requested by a user, an application program (e.g., a video player) for playing a video may be executed. The executed video player may generate a read request or a write request to the storage device 170 for playing a video file which a user requests. These requests may constitute a process, and each process may execute a task in a scheduling unit.

The OS kernel 134 is a configuration of OS and performs control operations between the application program 132 and hardware. The OS kernel 134 may include the execution of a program, an interrupt, multitasking, memory management, a file system, and a device driver. In the inventive concept, only a scheduler 136 and a CPU governor 138 provided as a part of the OS kernel 134 will be described.

The scheduler 136 assigns tasks schedule-requested by the application program 132 or OS to each of the cores of the multi-core processor 110. The scheduler 136 may monitor the scheduling events occurring in the application program 132 or OS. When a scheduling event occurs, the scheduler 136 determines a limited core selection boundary (hereinafter referred to as "LCSB") with reference to the statistical information or history of the task to be scheduled. The limited core selection boundary LCSB refers to the ranges of cores capable of processing the schedule-requested task most efficiently. In other words, the limited core selection boundary LCSB limits the scope of the candidate cores to which the schedule-requested task will be assigned. The limited core selection boundary LCSB may be determined with reference to at least one of the cache reusable ratio of a schedule-requested task Tc, the load state of the CPU core, and the setting of the user.

The scheduler 136 calculates a preemption compare index (PCI) for the CPU cores of the limited core selection boundary LCSB. In addition, the scheduler 136 uses a linear priority weight (LPW) that combines a fair class task and real time class tasks into a single table. The scheduler 136 may select an optimal CPU core, e.g., a target core (TC), by comparing the linear priority weight LPW of the schedule-requested task with the preemption compare index PCI of cores included in the limited core selection boundary LCSB. For example, the scheduler 136 detects whether there is a CPU core with the preemption compare index PCI less than the linear priority weight LPW of the schedule-requested task Tc, among the cores included in the limited core selection boundary LCSB. The scheduler 136 may assign the schedule-requested task to the selected CPU core depending on the comparison result.

The CPU governor 138 may obtain the driving voltage and driving clock of the multi-core processor 110 in the OS kernel 134. The frequency of the driving clock or the level of the driving voltage VDD may be determined depending on the driving voltage and the driving clock of the multi-core processor 110. However, it will be understood that the driving voltage and the driving clock of the multi-core processor 110 are not limited to only those disclosed herein. The CPU governor 138 may adjust the driving voltage level and the driving clock frequency of the multi-core processor 110 at the request of the OS kernel 134 or the scheduler 136. In addition, there may be a configuration for adjusting the driving clock frequency or the driving voltage level of the multi-core processor 110 in hardware under control of the CPU governor 138 driven by the OS kernel 134. For example, the performance controller 140, which changes the driving clock and the driving voltage of the multi-core processor 110 or various configurations depending on the call of the OS kernel 134 that is software, may control the driving voltage and the driving clock of the multi-core processor 110 in hardware.

The task scheduling method of the multi-core processor according to an exemplary embodiment of the inventive concept, which is performed in the layer of the OS kernel 134, has been briefly described above. According to an exemplary embodiment of the inventive concept, when a scheduling event occurs, a core is assigned in consideration of various environments as well as the assigned priority. In accordance with the features of the scheduler 136 according to an exemplary embodiment of the inventive concept, a task, which has a low CPU utilization even though the priority is high, may be scheduled in an order lower than an order of a task, which has a high CPU utilization even though the priority is low. Accordingly, various inefficiencies that occur when task scheduling is performed based on only priority may be reduced.

Figure 4:
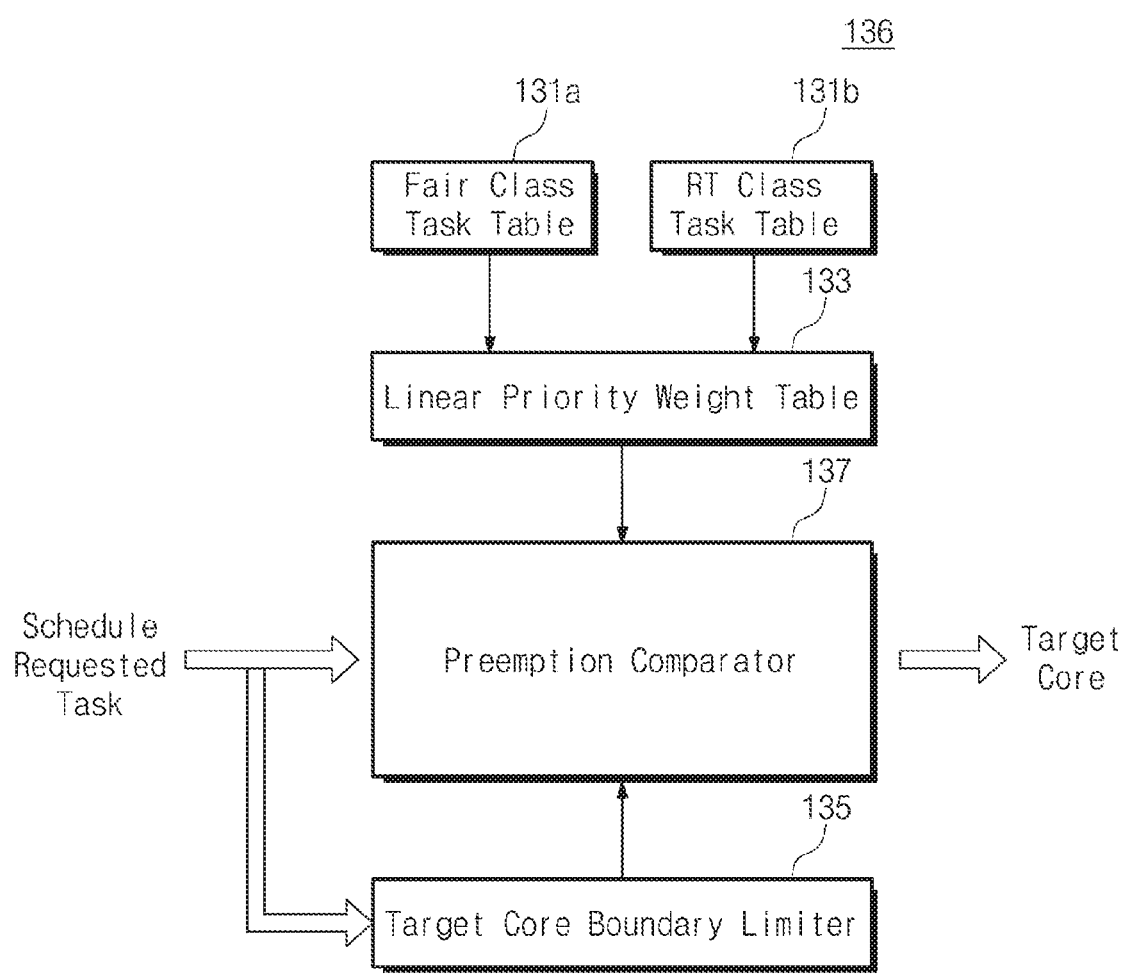
FIG. 4 is a block diagram illustrating a scheduler of FIG. 3, according to an exemplary embodiment of the inventive concept.

FIG. 4 is a block diagram illustrating a scheduler of FIG. 3, according to an exemplary embodiment of the inventive concept. Referring to FIG. 4, the scheduler 136 may include a fair class task table 131a, a real time class task table 131b, a linear priority weight table 133, a target core boundary limiter 135, and a preemption comparator 137.

The linear priority weight table 133 is a table for managing fair class (Fair Class) tasks and real time class (RT Class) tasks by using a single reference. The fair class task table 131a is a table of tasks that do not require real time processing. A relatively low priority value is assigned to the tasks listed in the fair class task table 131a during scheduling. For example, tasks, which do not matter even though the tasks are performed in the background, correspond to the above-described tasks. The real time class task table 131b includes the real time class (RT Class) tasks of high priority, which need to be processed in real time. For example, the real-time class (RT Class) task may be tasks requiring a prompt response entered through a user interface.

Generally, fair class tasks and real time class tasks are managed differentially during scheduling. In any case, a priority higher than the real time class task will not be assigned to the fair class task. In exemplary embodiments of the inventive concept, the fair class task and the real time class task may need to be compared and managed. Thus, the fair class tasks and the real time class tasks may be managed through the linear priority weight table 133 in a single table. For example, the fair class tasks and the real time class tasks may be set to new weights in the linear priority weight table 133. Hereinafter, the new weight may be referred to as the linear priority weight LPW. For example, the linear priority weight LPW may be a value converted to a new index in which priorities assigned to the fair class task and the real time class task are arranged in the reverse order.

The target core boundary limiter 135 selects the optimal candidate cores that will process the schedule-requested task. The target core boundary limiter 135 may select a target core boundary (TCB) in consideration of the expected performance and power consumption. For example, referring to the history of the schedule-requested task Tc, it is possible to select candidate cores depending on a cluster unit, a power domain unit, or the utilization of a core. For example, the candidates of the target core TC may be determined depending on the load magnitude of the schedule-requested task Tc, a cache reusable ratio, or criteria predetermined by a user. With reference to the drawings, it will be described in more detail how the target core boundary limiter 135 selects the target core boundary TCB.

The preemption comparator 137 may calculate the preemption compare index PCI of each of the CPU cores of the target core boundary TCB, using the linear priority weight LPW in the linear priority weight table 133. The preemption comparator 137 may compare whether there is a value less than the linear priority weight LPW of the schedule-requested task Tc among the CPU cores of the target core boundary TCB. The preemption comparator 137 may select the optimal core in consideration of the performance and the power consumption depending on the comparison result.

The configuration of the scheduler 136 according to an exemplary embodiment of the inventive concept has been briefly described above. Generally, the scheduler 136 is provided as software constituting the OS kernel 134. The scheduler 136 according to an exemplary embodiment of the inventive concept may include the above configurations as a software module. However, it will be understood that the function or configuration of the scheduler 136 does not necessarily need to be implemented as a software module.

Figure 5:
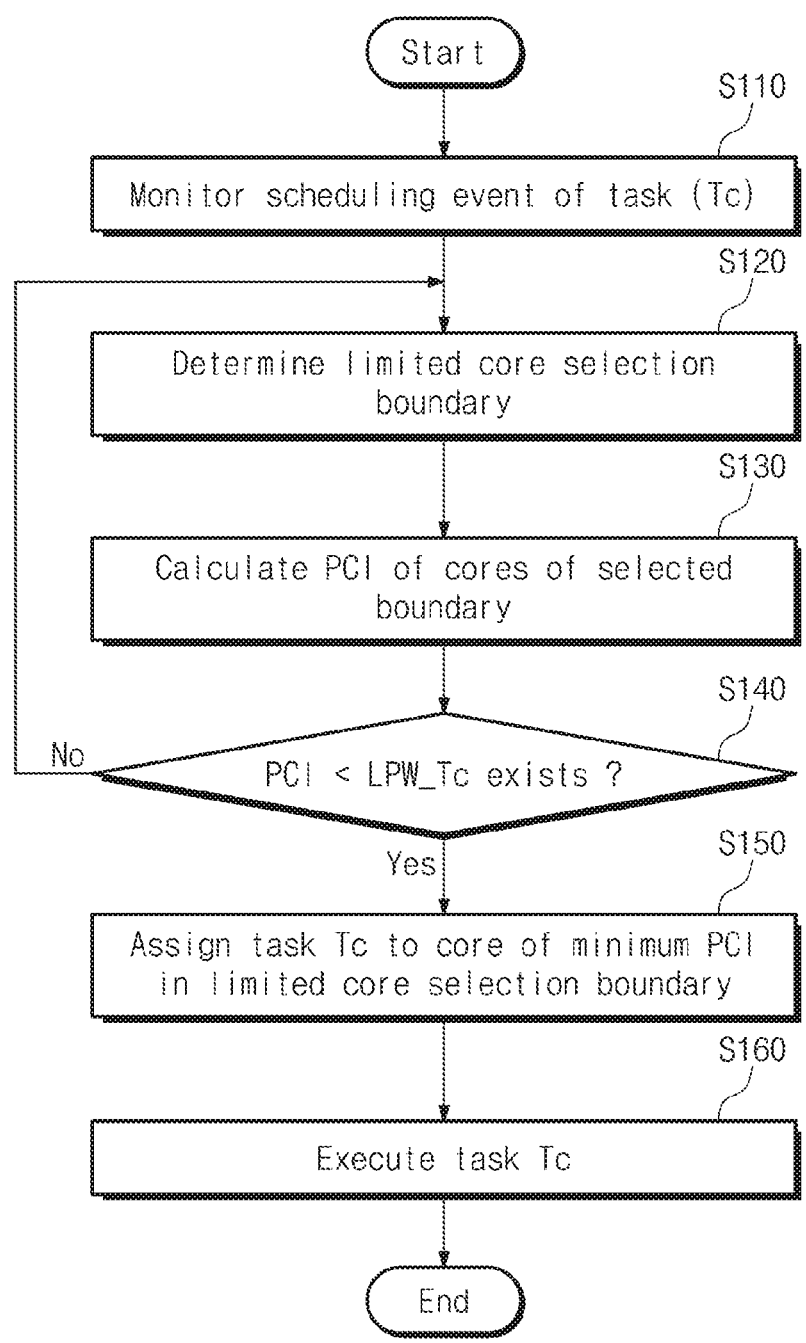
FIG. 5 is a flowchart schematically illustrating an operation of the scheduler of FIG. 4, according to an exemplary embodiment of the inventive concept.

FIG. 5 is a flowchart schematically illustrating an operation of the scheduler of FIG. 4, according to an exemplary embodiment of the inventive concept. Referring to FIG. 5, when a scheduling event occurs, the scheduler 136 may select a core (hereinafter, referred to as a "target core") that will execute a task, in consideration of not only the priority but also the utilization of the current cores, the expected power consumption, a cache reusable ratio, or the like.

In operation S110, the scheduler 136 (refer to FIG. 3) may monitor the scheduling event of the task that occurs periodically. Here, for convenience of description, a procedure for scheduling one schedule-requested task Tc will be described exemplarily.

In operation S120, the scheduler 136 may determine the limited core selection boundary LCSB with reference to the history information or statistical information of the schedule-requested task Tc. The limited core selection boundary LCSB is a setting to ensure the performance of an appropriate level or the power feature of an appropriate level when the schedule-requested task Tc is executed. For example, for the purpose of considering power consumption first of all, the limited core selection boundary LCSB may include only the CPU cores capable of being driven with low power. On the other hand, for the purpose of considering the performance or the CPU utilization first of all, cores with high cache affinity may be included in the limited core selection boundary LCSB. In other words, the scheduler 136 may determine the limited core selection boundary LCSB with reference to the cache reusable ratio of the schedule-requested task Tc, task load, and settings of a user.

In operation S130, the scheduler 136 calculates the preemption compare index (PCI) of CPU cores (or candidate cores) included in the limited core selection boundary LCSB. The preemption compare index PCI is a new parameter that indicates the current load state of the candidate cores. The preemption compare index PCI is a priority parameter based on the linear priority weight LPW, CPU utilization, and CPU capacity of each of the CPU cores included in the limited core selection boundary LCSB. In other words, the priorities of the real time class task or the fair class task is compared with each other and sometimes reversed by comparing the preemption compare index PCI value.

For example, the preemption compare index PCI of each of candidate cores may be determined by dividing a value from multiplying the linear priority weight LPW of the task running in the corresponding CPU core and the current utilization of the corresponding CPU core by the current calculation capacity of the corresponding CPU core. For example, one preemption compare index $PCI_N$ of the candidate cores may be calculated by the following Equation 1.

$$PCI_N = LPW_N \times \frac{UTIL_N}{CAP_N} \quad \text{[Equation 1]}$$

Herein, the linear priority weight $LPW_N$ denotes the linear priority weight LPW of the task running in the corresponding CPU core. Moreover, CPU utilization $UTIL_N$ may denote the current utilization of the corresponding CPU core, and CPU capacity $CAP_N$ may denote the current calculation capacity of the corresponding CPU core.

Accordingly, when the preemption compare index $PCI_N$ is calculated, it is possible to compare the preemption compare index $PCI_N$ reflecting the current load state of the candidate cores in the limited core selection boundary LCSB with the linear priority weight LPW of the schedule-requested task. Herein, it will be understood that the calculation of the preemption compare index $PCI_N$ reflecting the current load state of the candidate cores is not limited to Equation 1 described above. This is the reason that, in scheduling that prioritizes performance or power consumption, it is possible to calculate the preemption compare index $PCI_N$ of candidate cores in consideration of these parameters.

In operation S140, the scheduler 136 determines whether there is a core, to which the schedule-requested task Tc will be assigned, from among candidate cores, using the calculated preemption compare index PCI of each of the candidate cores. For example, the scheduler 136 may compare the preemption compare index PCI of each of the candidate cores with a linear priority weight LPW_Tc of the schedule-requested task Tc. When there is a value less than the linear priority weight LPW_Tc of the schedule-requested task Tc in the preemption compare index PCI of the candidate cores included in the limited core selection boundary LCSB (S140: Yes), the procedure proceeds to operation S150. On the other hand, when there is no value less than the linear priority weight LPW_Tc of the schedule-requested task Tc in the preemption compare index PCI of cores included in the limited core selection boundary LCSB (S140: No), the procedure returns to operation S120. In operation S120, the limited core selection boundary LCSB may be expanded or changed.

In operation S150, the scheduler 136 determines the core to which the schedule-requested task Tc will be assigned. The scheduler 136 may select a CPU core having a minimum value among preemption compare indexes PCIs having a value less than the linear priority weight LPW_Tc of the schedule-requested task Tc.

In operation S160, the schedule-requested task Tc is executed by the selected CPU core.

The task assigning method using the preemption compare index PCI according to an exemplary embodiment of the inventive concept has been described above. The preemption compare index PCI is a parameter that takes into account not only the priority of the core to which the current schedule-requested task Tc will be assigned, but also the utilization of the core and the capacity or capability of the core. In other words, even though a priority is relatively low, the schedule-requested task Tc may be executed in the CPU core prior to the task of a higher priority, depending on the current load states of the CPU cores.

Figure 6:
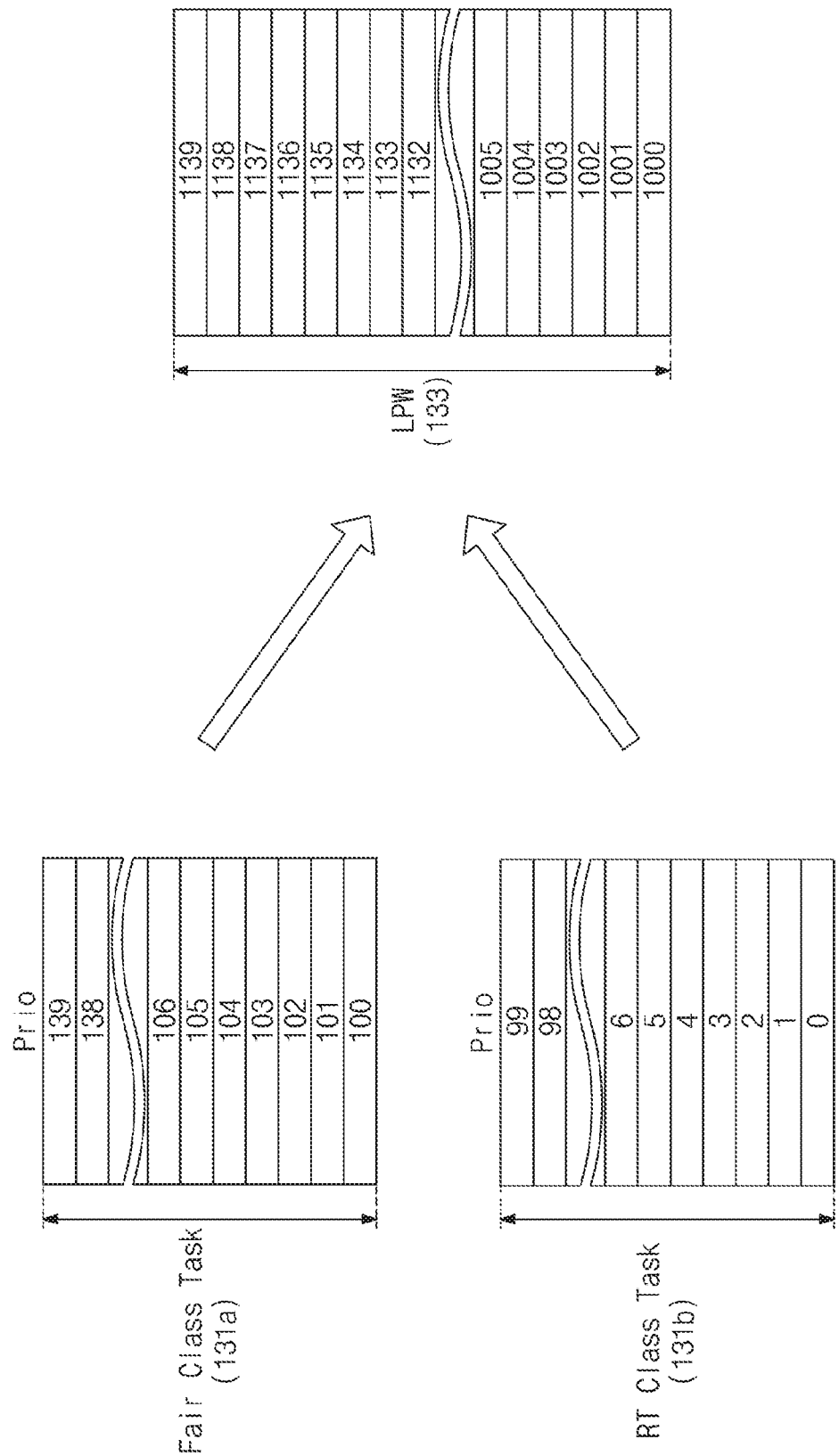
FIG. 6 is a diagram schematically illustrating a linear priority weight table (LPW Table), according to an exemplary embodiment of the inventive concept.

FIG. 6 is a diagram schematically illustrating a linear priority weight table (LPW Table), according to an exemplary embodiment of the inventive concept. Referring to FIG. 6, the linear priority weight table 133 may be generated by merging the fair class task table 131a and the real time class task table 131b.

The fair class task table 131a includes tasks that do not require real-time processing. For example, the fair class task (Fair class task) has a priority (Prio) value between 100 and 139. When any task receives a priority (Prio) value of 120, a lower priority and smaller time slice will be assigned to the task as compared to any other task to which a priority value of 100 is assigned in scheduling.

The real time class task table 131b may correspond to a priority (Prio) value from '0' to '99'. As the priority value of a task decreases, the task needs to be processed first of all. The real time class tasks always have the right to be executed before the fair class tasks. In other words, the real time class task and the fair class task are set not to compete on the same criteria.

The linear priority weight table 133 lists the fair class tasks and the real time class tasks with a single weight attribute to determine the priorities of the fair class tasks and the priorities of the real time class tasks as consecutive priorities. The linear priority weight table 133 may be generated by converting the priority (Prio) of the fair class task table 131a and the priority (Prio) of the real time class task table 131b into a new linear priority weight LPW. For example, the linear priority weight LPW may be generated by inverting the priority (Prio) value.

In the linear priority weight LPW, as the weight increases, the task needs to be processed first of all. For example, when the priority (Prio) value is 50 in the real time class task, the linear priority weight LPW may be 1100. On the other hand, when the priority (Prio) value is 100 in the fair class task, the linear priority weight LPW may be 1010.

The fair class tasks and the real time class tasks may be compared on a continuous line through the generation of the linear priority weight table 133. Accordingly, despite being a real time class task, the real time class task may be processed later than the fair class task in a scheduling process.

Figure 7:
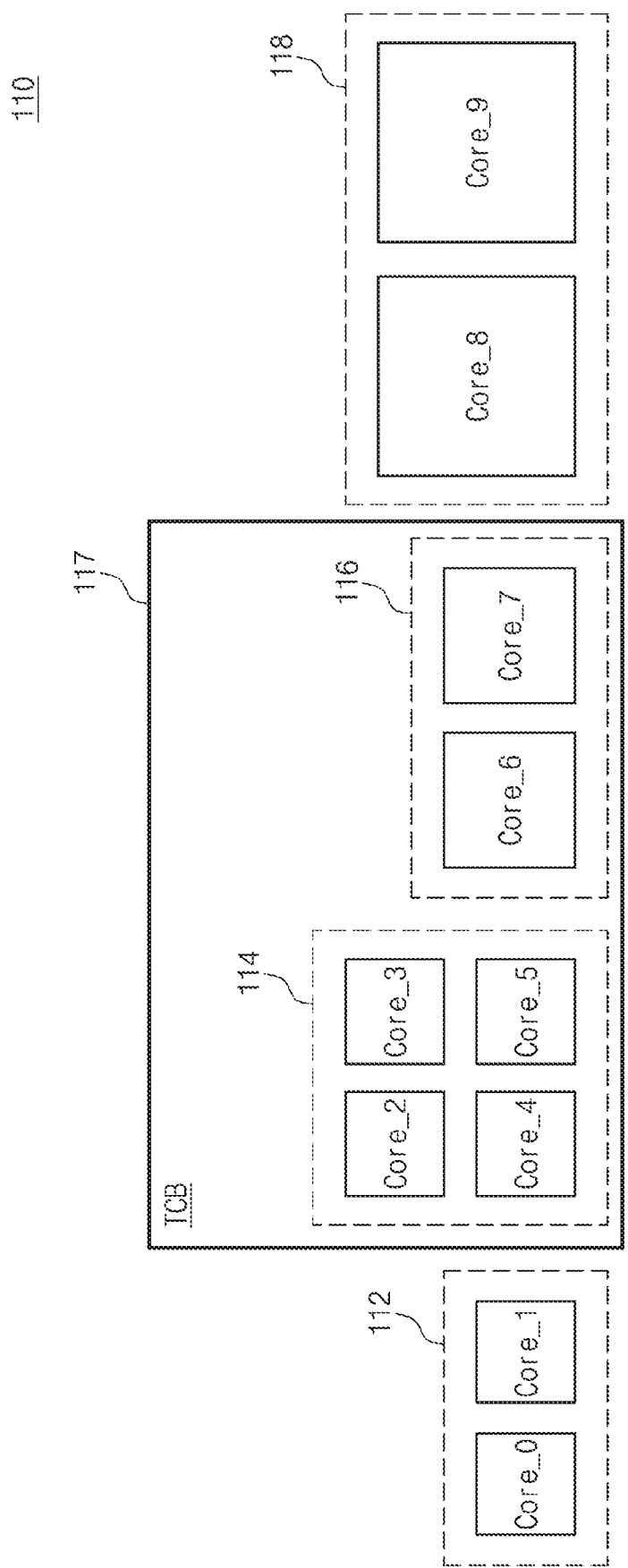
FIG. 7 is a diagram illustrating an operating feature of a target core boundary limiter according to an exemplary embodiment of the inventive concept.

FIG. 7 is a diagram illustrating an operating feature of a target core boundary limiter according to an exemplary embodiment of the inventive concept. Referring to FIG. 7, the target core boundary limiter 135 selects candidate cores that will process the schedule-requested task Tc. At least one candidate core is selected depending on the feature of schedule-requested task Tc. In addition, one of the candidate cores selected by the target core boundary limiter 135 will finally be selected as the core that will execute a task. For example, it is assumed that the multi-core processor 110 includes 10 CPU cores Core_0 to Core_9.

The CPU cores Core_0 to Core_9 may be classified into clusters or groups depending on a size, a processing speed, a processing capacity, or a power domain. For example, it is assumed that the CPU cores Core_0 to Core_9 are classified into a plurality of clusters 112, 114, 116, and 118 depending on the power domain. The target core boundary limiter 135 may determine the target core boundary TCB with reference to the context of the schedule-requested task Tc or other history information. At this time, the target core boundary TCB may be determined depending on the current utilization or the load of the CPU cores, a cache reusable ratio, and criteria predetermined by a user.

For example, it is assumed that task 'A' is schedule-requested in a setting to increase a cache reusable ratio. Then, the cluster including the core in which the parent task of task 'A' is executed may be selected as the target core boundary TCB with reference to a task ID or context. For example, when there is a history that the parent task of task 'A' has been processed in the cluster 114 and the cluster 116, the target core boundary limiter 135 may select the cluster 114 and the cluster 116 as a target core boundary TCB 117. This may provide a higher cache affinity when the child task is executed in the CPU core where the parent task has been executed, thus increasing the cache hit ratio. The method of selecting the target core boundary TCB for increasing the cache affinity or cache hit ratio will be described in more detail below with reference to the drawings.

In an exemplary embodiment of the inventive concept, it is assumed that the parent task or related task of task 'A' has been executed in the cluster 112 and the cluster 114, each of which is composed of cores with substantially the same frequency or performance, or exists in a run-queue. However, when the cores of the cluster 112 are in the sleep state and the cores of the cluster 114 are executing the task, it is advantageous to select the cluster 114 as the target core boundary TCB in terms of power efficiency. This is because a considerable amount of power may be consumed to wake up from the sleep state.

In addition, the target core boundary TCB may be set by various criteria. For example, the target core boundary TCB may be applied to assign a specific task to only the cores pre-selected by the user.

An exemplary operation of the target core boundary limiter 135 has been briefly described above. However, the selection criterion of the target core boundary TCB of the target core boundary limiter 135 is not limited thereto. The target core boundary TCB may be selected by applying various criteria depending on the features of the multi-core processor 110 or depending on the features of the schedule-requested task Tc.

Figure 8:
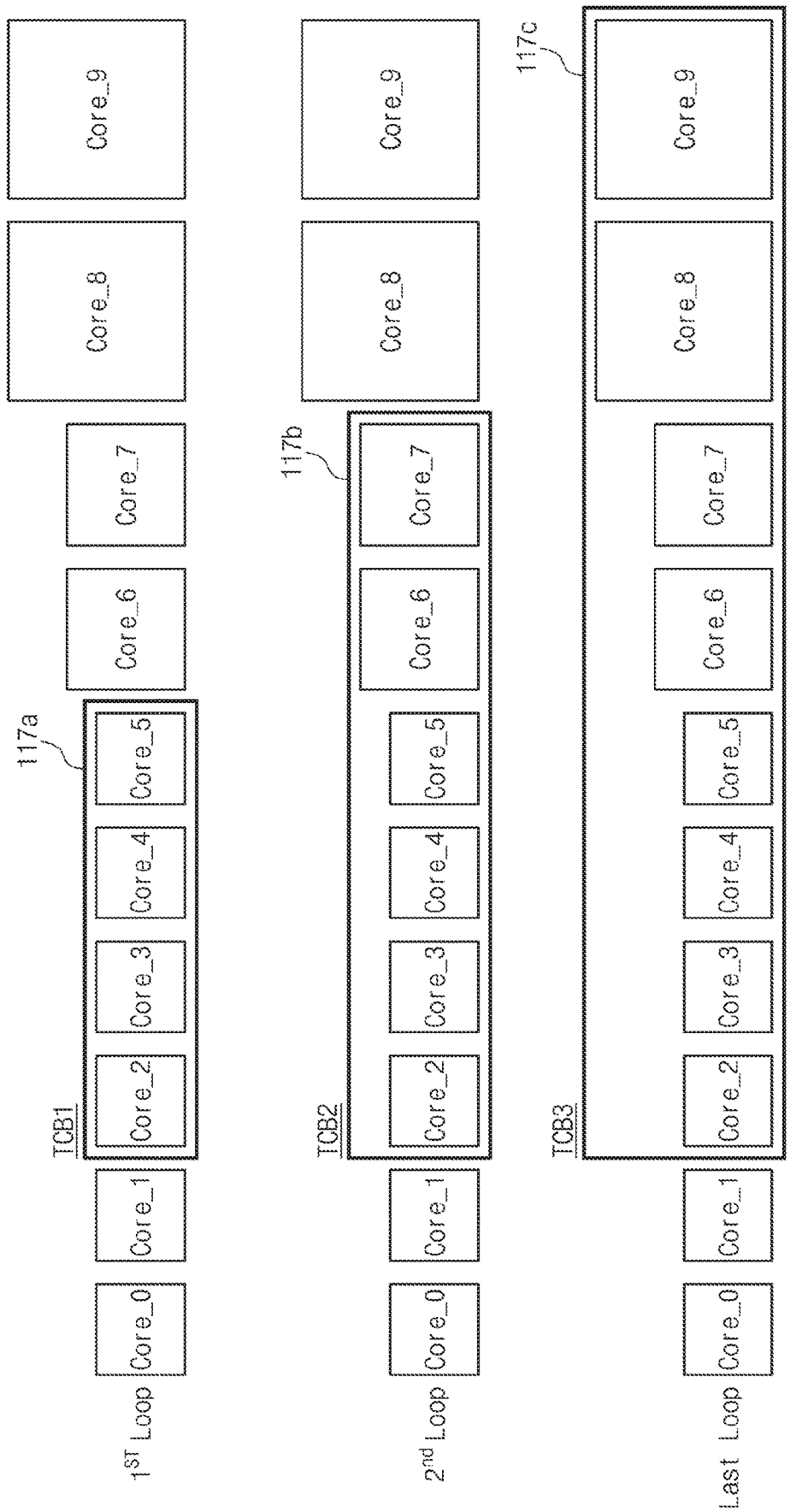
FIG. 8 is a diagram illustrating a method of selecting a target core boundary, according to an exemplary embodiment of the inventive concept.

FIG. 8 is a diagram illustrating a method of selecting a target core boundary, according to an exemplary embodiment of the inventive concept. Referring to FIG. 8, when CPU cores matching the condition are not present in the selected target core boundary TCB, the range of the target core boundary TCB may be changed or extended. In other words, the number of candidate cores may increase.

For example, the preemption compare index PCI of each of the candidate cores of the selected target core boundary TCB may be greater than the linear priority weight LPW_Tc of the schedule-requested task Tc. In this case, when tasks are assigned to the candidate cores, there is no gain in terms of power or CPU utilization. Accordingly, in this case, the range of the target core boundary TCB may be extended.

In a first selection loop (1st Loop) for the target core boundary TCB, it is assumed that the target core boundary limiter 135 selects cores Core_2, Core_3, Core_4, and Core_5 as a first target core boundary TCB1 117a. When the preemption compare index PCI of one of the cores Core_2, Core_3, Core_4, and Core_5 is less than the linear priority weight LPW_Tc of the schedule-requested task Tc, the schedule-requested task Tc will be assigned to the corresponding core. However, when the preemption compare index PCI of each of cores in the first target core boundary 117a is greater than the linear priority weight LPW_Tc of the task, it means that selectable priority cores are not present. Then, the target core boundary limiter 135 may perform a second selection loop (2nd Loop) for selecting a second target core boundary TCB2 117b by extending the range of the cores.

In the second selection loop (2nd Loop), when an optimal core according to the comparison of the preemption compare index PCI among the cores Core_2, Core_3, Core_4, Core_5, Core_6, and Core_7 is present, the schedule-requested task Tc may be assigned to the corresponding core. However, there may be no core satisfying requirements among the cores Core_2, Core_3, Core_4, Core_5, Core_6, and Core_7. Then, the target core boundary limiter 135 may perform the final selection loop (Last Loop) for selecting a third target core boundary TCB3 117c by extending the range of the cores.

In the final selection loop (Last Loop), when an optimal core according to the preemption compare index PCI among the cores Core_2, Core_3, Core_4, Core_5, Core_6, Core_7, Core_8, and Core_9 is present, the schedule-requested task Tc may be assigned to the corresponding core.

The method of selecting the target core boundary TCB by the target core boundary limiter 135 has been briefly described above. When the target core boundary TCB is selected, candidate cores may be selected to provide optimal performance in consideration of power consumption, a cache reusable ratio, and the features of a task.

Figure 9:
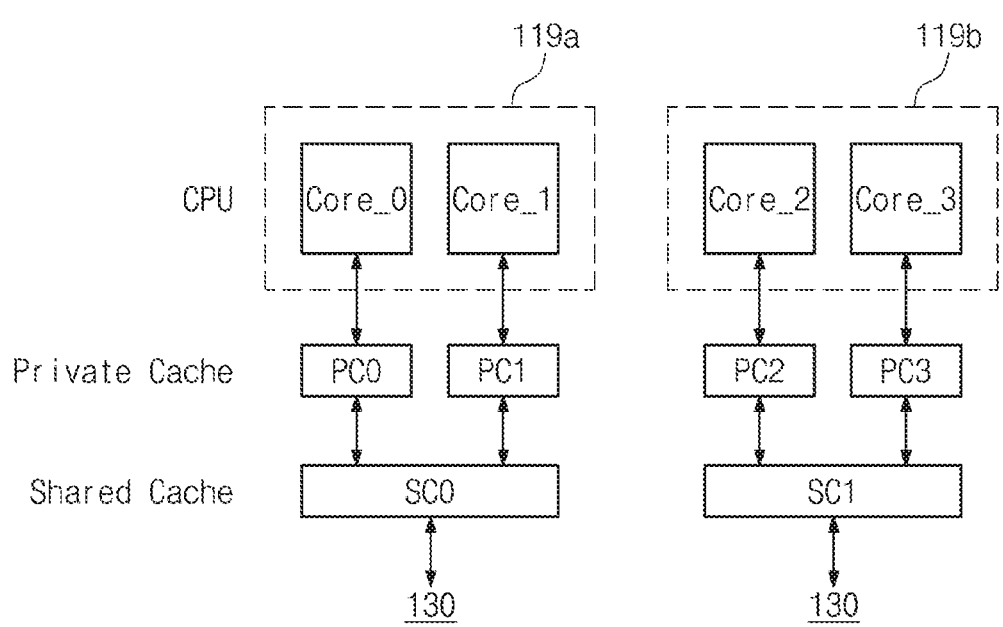
FIGS. 9 and 10 are diagrams illustrating a feature of considering a cache reusable ratio when a target core boundary is selected, according to an exemplary embodiment of the inventive concept.
Figure 10:
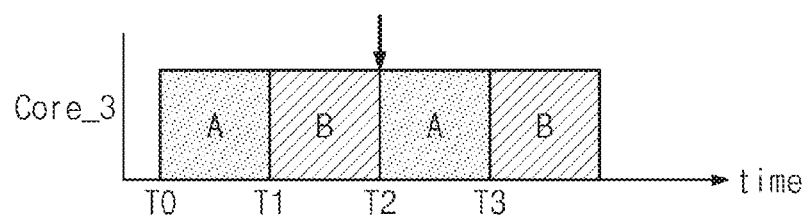

FIGS. 9 and 10 are diagrams illustrating a feature of considering a cache reusable ratio when a target core boundary is selected, according to an exemplary embodiment of the inventive concept. Referring to FIG. 9, the CPU cores Core_0, Core_1, Core_2, and Core_3 have substantially the same performance, size, and processing speed as one another but belong to different clusters 119*a* and 119*b*.

The CPU cores Core_0, Core_1, Core_2, and Core_3 include private caches PC0, PC1, PC2, and PC3, which belong to CPU cores, respectively. For example, private caches PC0, PC1, PC2, and PC3 may be an L1 cache or L2 cache. In addition, the clusters 119*a* and 119*b* include shared caches SC0 and SC1, respectively.

When the CPU core Core_0 fails to execute a task X completely within a given runtime, pieces of data associated with the task X may be present in the private cache PC0. At this time, when the task X or related task is executed again, the hit ratio in the private cache PC0 may increase.

In addition, when the CPU core Core_3 has performed a task Y, pieces of data associated with the task Y are still present in the private cache PC3 and the shared cache SC1. At this time, the scheduling of task Y or a child task may be requested. Moreover, the CPU core Core_3 may be preempted by other tasks with a higher priority. At this time, the task Y or the child task may be assigned to the CPU core Core_2 sharing the shared cache SC1 with the CPU core Core_3. Then, the cache hit ratio may be guaranteed by the cache data remaining in the shared cache SC1.

Referring to FIG. 10, it is assumed that task 'A' and task 'B' are alternately assigned to the CPU core Core_3.

It is assumed that task 'A' starts to be executed in the CPU core Core_3 at time T0 and then is completed at time T1. Next, task 'B' is executed in succession. It is assumed that task 'B' is completed at time T2.

When the scheduling of task 'A' is requested at time T2, the target core boundary limiter 135 according to an exemplary embodiment of the inventive concept may select the cluster 114 as the target core boundary TCB to increase the cache reusable ratio. The target core boundary limiter 135 selects the core group including the CPU core Core_3 with reference to the history information of the task 'A'. Then, one of the CPU cores Core_2 and Core_3 included in the selected target core boundary TCB may be selected as a target core. In this case, when the CPU core Core_3 is selected, a high cache reusable ratio may be guaranteed by the cache data existing in the private cache PC3. However, even though the CPU core Core_2 is selected as the second best, the cache reusable ratio may be secured due to the cache data existing in the shared cache SC1.

Figure 11:
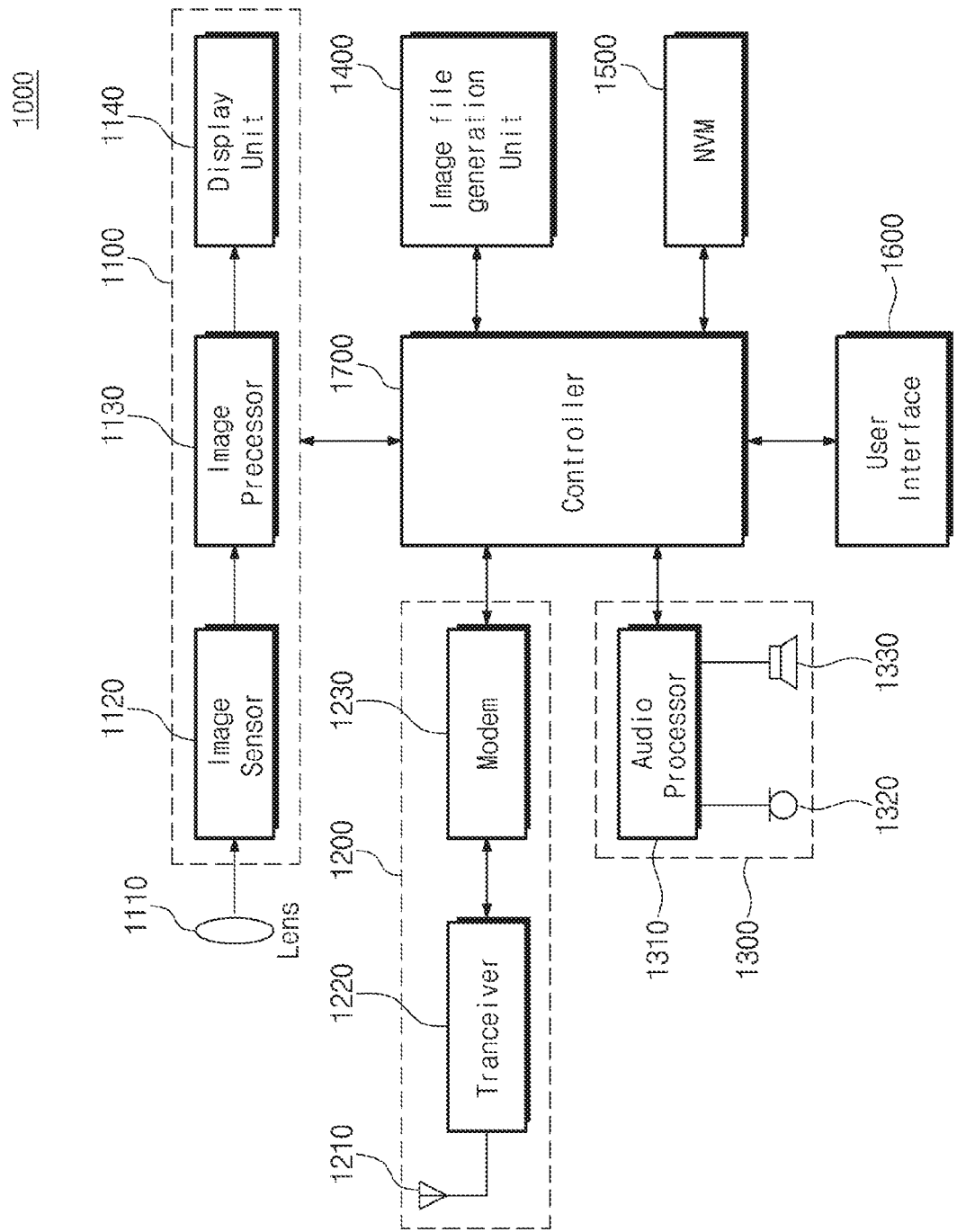
FIG. 11 is a block diagram illustrating a portable terminal, according to an exemplary embodiment of the inventive concept.

FIG. 11 is a block diagram illustrating a portable terminal, according to an exemplary embodiment of the inventive concept. Referring to FIG. 11, a portable terminal 1000 according to an exemplary embodiment of the inventive concept includes an image processing unit 1100, a wireless transceiver unit 1200, an audio processing unit 1300, an image file generation unit 1400, a nonvolatile memory device 1500, a user interface 1600, and a controller 1700.

The image processing unit 1100 may include a lens 1110, an image sensor 1120, an image processor 1130, and a display unit 1140. The wireless transceiver unit 1200 includes an antenna 1210, a transceiver 1220, and a modulator/demodulator (modem) 1230. The audio processing unit 1300 includes an audio processor 1310, a microphone 1320, and a speaker 1330.

Herein, the nonvolatile memory device 1500 may be implemented with a memory card (e.g., a MMC, an eMMC, a SD card, or a micro SD card) or the like according to an exemplary embodiment of the inventive concept. The controller 1700 may be implemented with a SoC that drives an application program, OS, or the like. A scheduler and a CPU governor that manage a task according to an exemplary embodiment of the inventive concept may be included in the kernel of the OS driven by the SoC.

Accordingly, the kernel may schedule the real time class tasks and the fair class tasks in consideration of not only a priority but also the current load state of the CPU cores, power consumption, and a cache reusable ratio. Accordingly, it is possible to increase the power or processing speed of an application processor performing heterogeneous multiprocessing (HMP).

In the mobile device and operating method thereof according to exemplary embodiments of the inventive concept, it is possible to minimize unnecessary power consumption or performance degradation due to a load imbalance that occurs in priority-dependent task scheduling in a multi-core processor.

While the inventive concept has been shown and described with reference to exemplary embodiments thereof, it will be apparent to those of ordinary skill in the art that various changes and modifications in form and details may be made thereto without departing from the spirit and scope of the inventive concept as set forth in the following claims.

What is claimed is:

1. A scheduling method of a system on chip including a multi-core processor, the scheduling method comprising:
receiving a schedule-requested task;
converting a priority assigned to the schedule-requested task into a linear priority weight using a linear priority weight table generated by a merging a fair class task table and a real time class task table, the fair class task table including fair class tasks having first priority values, the real time class task table including real time class tasks having second priority values higher than the first priority values, the linear priority weight table including linear priority weights of the fair class tasks and the real time class tasks in which at least one of the fair class tasks has a greater linear priority weight than at least one of the real time class tasks;
calculating a preemption compare index indicating a current load state of each of a plurality of candidate cores;
comparing the linear priority weight with the preemption compare index of the each of the plurality of candidate cores to generate a comparison result;
assigning the schedule-requested task to one candidate core of the plurality of candidate cores based on the comparison result indicating that the preemption compare index of the one candidate core is less than the linear priority weight; and
executing the task using the assigned one candidate core.

2. The scheduling method of claim 1, further comprising: selecting the plurality of candidate cores, wherein the plurality of candidate cores are selected with reference to at least one of the current load state of the each of the plurality of candidate cores, or a setting range of a user.

3. The scheduling method of claim 1, wherein the plurality of candidate cores include a cluster in which the schedule-requested task or a parent task of the schedule-requested task is processed to increase a cache reusable ratio.

4. The scheduling method of claim 3, wherein the cluster includes a first core that executes the schedule-requested task or the parent task and a second core that shares a cache with the first core.

5. The scheduling method of claim 1, wherein comparing the linear priority weight with the preemption compare index includes detecting whether a core having a preemption compare index value less than the linear priority weight is present among the plurality of candidate cores.

6. The scheduling method of claim 5, wherein comparing the linear priority weight with the preemption compare index further includes changing a range of the plurality of candidate cores when the core having the preemption compare index value less than the linear priority weight is not present among the plurality of candidate cores.

7. The scheduling method of claim 1, wherein a preemption compare index corresponding to the one candidate core corresponds to a second value that is obtained from dividing a first value, wherein the first value is obtained by multiplying a linear priority weight of a task currently running in the one candidate core and utilization of the one candidate core, by an operation capacity of the one candidate core.

8. A system on chip comprising:
a multi-core processor including a plurality of cores; and
a working memory onto which an operating system driven by the multi-core processor is loaded,
wherein the operating system is configured to:
convert a priority assigned to a task, scheduling of which is requested, into a linear priority weight using a linear priority weight table generated by a merging a fair class task table and a real time class task table, the fair class task table including fair class tasks having first priority values, the real time class task table including real time class tasks having second priority values higher than the first priority values, the linear priority weight table including linear priority weights of the fair class tasks and the real time class tasks in which at least one of the fair class tasks has a greater linear priority weight than at least one of the real time class tasks;
calculate preemption compare indexes indicating a current load state of each of a plurality of candidate cores; and
assign the task to one candidate core of the plurality of candidate cores by comparing the calculated preemption compare indexes with the linear priority weight and determining that a preemption compare index of the one candidate core indicates a lower priority than the linear priority weight,
wherein the task is executed using the assigned one candidate core.

9. The system on chip of claim 8, wherein the first condition is a condition considering at least one of a cache reusable ratio of the each of the plurality of cores, the current load state of the each of the plurality of cores, or a setting range of a user.

10. The system on chip of claim 9, wherein, when the cache reusable ratio is considered, a cluster, in which the task or a parent task of the task is processed, among the plurality of cores is included in the plurality of candidate cores.

11. The system on chip of claim 8, wherein the operating system converts the priority of the task into the linear priority weight by mapping the priority of the task to a linear priority weight table.

12. The system on chip of claim 11, wherein the linear priority weight in the linear priority weight table is arranged in a reverse order of the priority.

13. The system on chip of claim 8, wherein a preemption compare index of the each of the plurality of candidate cores corresponds to a second value that is obtained from dividing a first value, wherein the first value is obtained by multiplying a linear priority weight of a task currently running in the one candidate core and utilization of the one candidate core, by an operation capacity of the one candidate core.

14. A scheduling method of a system on chip including a plurality of central processing unit (CPU) cores, the scheduling method comprising:
converting a priority of a task, scheduling of which is requested, into a linear priority weight using a linear priority weight table generated by a merging a fair class task table and a real time class task table, the fair class task table including fair class tasks having first priority values, the real time class task table including real time class tasks having second priority values higher than the first priority values, the linear priority weight table including linear priority weights of the fair class tasks and the real time class tasks in which at least one of the fair class tasks has a greater linear priority weight than at least one of the real time class tasks;
selecting a plurality of candidate cores among the plurality of CPU cores depending on an operation condition;
calculating preemption compare indexes indicating a current load state of each of the plurality of candidate cores;
selecting one of the plurality of candidate cores as a target core for assigning the task, by comparing the preemption compare indexes of the each of the plurality of candidate cores with the linear priority weight and determining that the preemption compare index of the one of the plurality candidate cores is less than the linear priority weight based on the comparison; and
executing the task using the assigned one candidate core.

15. The scheduling method of claim 14, wherein the operation condition includes improvement of a cache reusable ratio of the each of the plurality of candidate cores, reduction of power consumption, and a core range selected by a user.

16. The scheduling method of claim 14, wherein each of the preemption compare indexes is calculated by multiplying a linear priority weight of a task currently running in a corresponding CPU core and utilization of the corresponding CPU core.

17. The scheduling method of claim 14, wherein each of the preemption compare indexes is calculated by dividing a value, which is obtained by multiplying a linear priority weight of a task currently running in a corresponding CPU core and utilization of the corresponding CPU core, by an operation capacity of the corresponding CPU core.

* * * * *